United States Patent [19]

Hartman et al.

[11] Patent Number: 4,848,937
[45] Date of Patent: Jul. 18, 1989

[54] SEAL FOR AN AXLE BEARING

[75] Inventors: Hendrikus G. Hartman, Maartensdijk; Cornelis Labrie, Nieuwegein; Jan Leijenhorst, Hendrick Ido Ambacht; Adrianus Rietveld, Nieuwegein, all of Netherlands

[73] Assignee: SKF Industrial Trading and Development Company B.V., Nieuwegein, Netherlands

[21] Appl. No.: 857,121

[22] Filed: Apr. 29, 1986

[30] Foreign Application Priority Data

May 15, 1985 [NL] Netherlands ............... 8501411

[51] Int. Cl.[4] ................................ F16J 15/447
[52] U.S. Cl. ................................ 384/480; 277/56; 277/57; 277/70
[58] Field of Search ............... 277/25, 53–57, 277/70, 75; 384/144, 480, 135, 478, 538

[56] References Cited

U.S. PATENT DOCUMENTS

| 1,105,268 | 7/1914 | Gohlke | 384/480 |
| 2,281,905 | 5/1942 | Young | 277/56 |
| 2,740,647 | 4/1956 | Van Pelt | 277/56 X |
| 4,458,957 | 7/1984 | Greener | 277/53 X |

FOREIGN PATENT DOCUMENTS

| 8150/27 | of 1928 | Australia | 277/56 |
| 470121 | 6/1926 | Fed. Rep. of Germany | 277/57 |
| 1109470 | 6/1961 | Fed. Rep. of Germany | 384/480 |
| 1321018 | 2/1963 | France | 277/57 |
| 1470057 | 1/1967 | France | 277/57 |
| 690521 | 6/1965 | Italy | 277/56 |
| 1050826 | 12/1966 | United Kingdom | 277/57 |

Primary Examiner—Allan N. Shoap
Attorney, Agent, or Firm—Rosen, Dainow & Jacobs

[57] ABSTRACT

A seal for an axle bearing lubricated with oil, including a swivel ring fixed to the shaft and protruding radially outward which operates in conjunction with a sealing ring connected to the bearing housing and protruding radially inward. Between the sealing ring and the swivel ring a separation ring is located which protrudes radially inward and is connected to the bearing housing. A number of surfaces on the insides of the sealing and separation rings, together with corresponding surfaces on the outside of the swivel ring, enclose annular gaps, whereby several of these surfaces are conically at an angle from the inside to the outside with regard to the cardioid of the shaft.

13 Claims, 1 Drawing Sheet

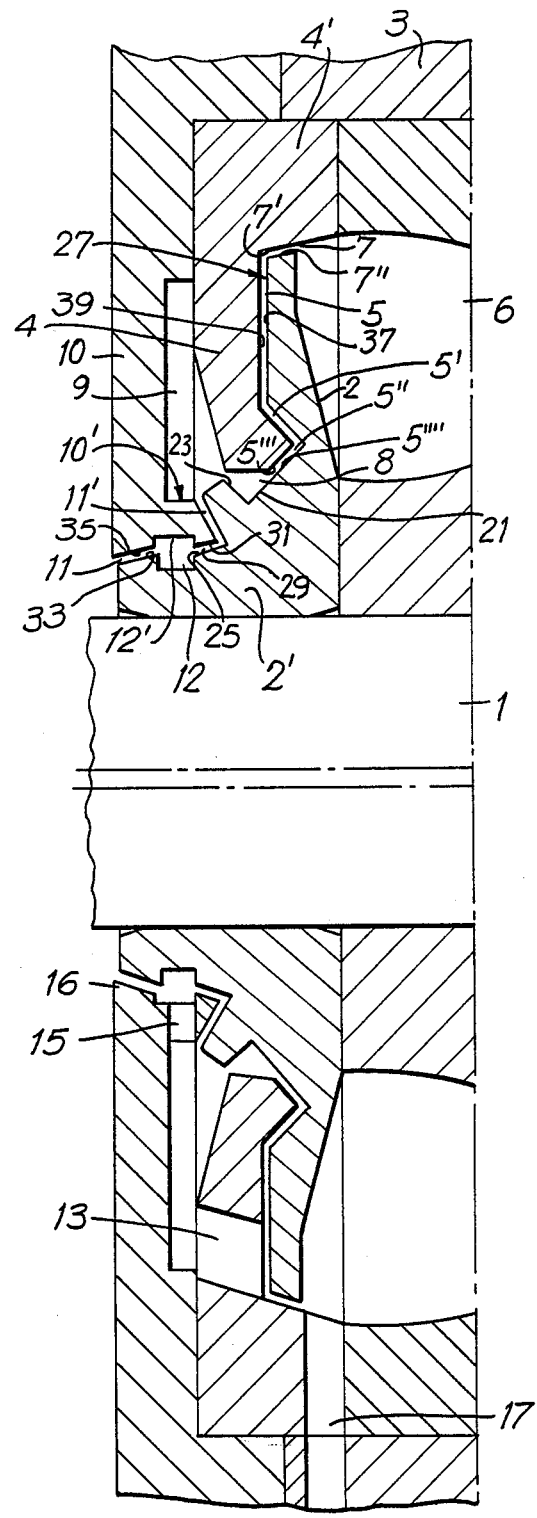

SEAL FOR AN AXLE BEARING

BACKGROUND OF THE INVENTION

The invention concerns a seal for an axle bearing lubricated with oil, including a swivel ring fixed to the shaft and protruding radially outward which operates in conjunction with a sealing ring connected to the bearing housing and protruding radially inward. A similar seal is generally known.

Known seals of this type cannot usually prevent the lubricant entirely from leaking out, especially in bearings for shafts with a relatively large diameter which have to rotate at a relatively high speed.

The purpose of the invention is to provide an improved axle bearing seal of the type mentioned, in particular for shafts with a relatively large diameter which have to rotate at a relatively high speed.

SUMMARY OF THE INVENTION

This purpose is achieved because the seal according to the invention has a separation ring protruding radially inward, connected to the bearing housing and located between the sealing ring and the swivel ring, and because a number of surfaces on the insides of the sealing and separation rings, together with corresponding surfaces on the outside of the swivel ring, enclose annular gaps, several of these surfaces extending conically at an angle from the inside to the outside with regard to the cardioid of the shaft.

In a seal formed in this manner, when the shaft rotates, the swivel ring will function as a seal together with the separation ring under the influence of the centrifugal forces generated, because when the shaft rotates the oil inside the seal is forced to flow to the bearing under the influence of the centrifugal forces.

In an advantageous manner the swivel ring has a hub protruding axially outward and surrounding the shaft, and the separation ring has a hub protruding axially inward and connected to the housing, whereby the inner surface—with regard to the axle bearing—of the separation ring and the axially outer surface of the swivel ring enclose a narrow radially extending channel which is linked to the inside of the axle bearing by way of an annular gap formed between the outer circumferential perimeter of the swivel ring and the inner circumferential surface of the hub of the separation ring. The channel is linked by way of an annular gap formed between the outer circumferential surface of the separation ring and the outer circumferential surface of the hub of the swivel ring to a generally annular inner chamber formed by an annular recess in the inner surface of the sealing ring facing the axle bearing, whereby annular gaps are formed between the generally annular inner surface of the inner part of the sealing ring and an outer surface of the hub of the swivel ring, and between the inner circumferential plane of the sealing ring and the outer circumferential surface of the hub of the swivel ring. Preferably, one or more openings extend through the lower part of the separation ring by way of which the outermost part of the inner chamber is linked to the outermost part of the radial slit-shaped channel, so that any oil which escapes into the inner chamber is carried back into the bearing.

In an advantageous manner, a groove may run around the inner circumferential surface of the sealing ring and/or the opposite part of the outer circumferential surface of the hub of the swivel ring, which, alone or together form(s) between the ends of the narrow radially extending circumferential channel between the inner circumferential surface of the sealing ring and the outer circumferential surface of the hub of the swivel ring a radially widened part of this channel. Preferably, at least one opening extends through the inner part of the sealing ring and at the bottom thereof, which opening leads to the groove.

This groove or these grooves can catch any escaping drops of oil which can subsequently be carried into the inner chamber.

In an advantageous manner the outer surface of the sealing ring, at the outside of the annular gap between the inner circumferential surface of the sealing ring and the outer circumferential surface of the hub of the swivel ring, will protrude outward with regard to the top surface of said hub, so that an edge is formed which runs around the gap, whereby any drops of oil which might want to escape outward are driven back inside.

It should be noted that so-called labyrinth seals are also known, for example from the British Pat. No. 79 14111 (corresponding to U.S. Pat. No. 4,458,957). However, this type of seal serves mainly to prevent outside dirt from getting into the bearing, by generating an outward flow in the labyrinth. The seal against outside leakage of the lubricant consists in this case of a sealing ring of a resilient material, installed in the bearing housing against the shaft, so that high rotation speeds of the shaft will generate relatively large amounts of friction heat. Moreover, a similar labyrinth seal has to be mounted as one unit, which is cumbersome.

BRIEF FIGURE DESCRIPTION

The invention is described in more detail by means of the drawing which shows an axial section of a model of execution of the seal according to the invention.

DETAILED DISCLOSURE OF THE INVENTION

As shown in the drawing, the seal includes a swivel ring 2 fixed around the shaft 1, which swivel ring has a hub 2' protruding axially outward and surrounding shaft 1. The bearing housing 3 contains a separation ring 4 which has a hub 4' protruding axially inward and connected to the bearing housing 3. The inner axial surface of the separation ring 4 and the outer axial surface of the swivel ring 2 enclose a narrow radially extending channel 5 which has parts 5' and 5" which extend therefrom conically axially inwardly and thence conically axially outwardly with respect to the cardioid of shaft 1. Channel 5 is linked to the inside 6 of the axle bearing by way of the annular gap 7, while this channel 5, 5', 5", by way of the annular gap 8 consisting of two parts extending conically axially outwardly and thence conically axially outwardly with respect to the cardioid of shaft 1, is linked to the inner chamber 9 formed by a recess in the inner surface—facing the bearing—of sealing ring 10 which is connected to the housing 3 and protrudes radially inward.

Between the inner circumferential surface of the sealing ring 10 and the outer circumferential surface of the hub 2' of the swivel ring 2 there is an annular passage gap 11 with a part 11' running conically axially and radially inwardly from the chamber 9 and, between the annular inner surface of the inner part 10' of the sealing ring 10 and an outward facing surface of the hub 1', whereby an annular channel is formed by the surrounding grooves 12 and 12'.

Through the separation ring 4 and in the lower part thereof an opening 13 is provided by way of which the radially outermost part of the inner chamber 9 is linked to the radially outermost part of the narrow radially extending slitshaped channel 5.

Through the inner part 10' of the sealing ring 10 and at the bottom thereof an opening 15 is provided by way of which the groove 12 is linked to the inner chamber 9.

On the axial outside of the annular gap 11 the outer surface of the sealing ring 10 protrudes outward with regard to the top surface of the hub 2', so that an edge 16 is formed which runs around the gap 11. In addition, an oil outlet 17 is shown.

Thus, the seal according to the invention consists essentially of three parts, i.e., the swivel ring 2, the separation ring 4 and the sealing ring 10, which parts can be mounted separately in a simple manner.

We claim:

1. In a seal for an axle bearing lubricated with oil, including a swivel ring fixed to a shaft having an axis and protruding radially outward, a sealing ring connected to a bearing housing and protruding radially inward, whereby said swivel ring and sealing ring define a seal and said swivel ring being axially closer to the bearing; the improvement comprising a separation ring connected to said bearing housing and extending radially inward between said swivel ring and sealing ring, said swivel ring, and said sealing and separation rings having a plurality of conical surfaces which define annular gaps therebetween, said gaps being between said swivel ring and said separation ring, and between said swivel ring and said sealing ring, each of said annular gaps having a diameter measured transverse from the axis of said shaft, a plurality of said annular gaps being defined by opposing conical surfaces extending with increasing diameters toward the axial interior of said bearing, said swivel ring having a hub extending axially outward of said swivel ring and surrounding said shaft, and said separation ring having a hub extending axially inward of said separation ring and connected to said housing, an axial outer surface of said swivel ring and an axial inner surface of said separation ring bounding a narrow radially extending channel linked to the interior of the bearing by way of the annular gap between a radial outer surface of said swivel ring and a radial inner surface of the hub of said separation ring.

2. The seal for an axle bearing of claim 1 wherein an annular chamber is formed between an axially outer surface of said separation ring and an axially inner surface of said sealing ring, said channel being linked to said chamber by way of an annular gap beteween a radially outer surface of the hub of said swivel ring and a radially inner surface of said separation ring.

3. The seal for an axle bearing of claim 2 wherein said sealing ring has a generally axially inward extending portion radially inward of said chamber, a first annular gap is formed between said hub of said swivel ring and a generally annular radially inner surface of said sealing ring, and a second annular gap is formed between said hub of said swivel ring and a generally annular radially inner surface of said portion of said sealing ring.

4. The seal for an axle bearing of claim 3 wherein the radially innermost portion of said channel is comprised of a first radially inner conical portion having its smallest diameter at its axial outermost position, and joined to a second conical portion inclined in the opposite direction.

5. The seal for an axle bearing of claim 3 wherein the chamber is conical to have a greater axial dimension at its radially inner portion.

6. The seal for an axle bearing of claim 3 wherein a hole is provided extending between a radially outer portion of said chamber and a radially outer portion of said channel.

7. The seal for an axle bearing of claim 3 wherein an annular groove is provided in said sealing ring between said first and second annular gaps.

8. The seal for an axle bearing of claim 7 wherein a hole extends in said sealing ring between said groove and a radially inner portion of said chamber.

9. The seal for an axle bearing of claim 3 wherein an annular groove is provided in said hub of said swivel ring between said first and second annular gaps.

10. The seal for an axle bearing of claim 9 wherein a hole extends in said sealing ring between said groove and a radially inner portion of said chamber.

11. The seal for an axle bearing of claim 3 wherein an annular groove is provided in said sealing ring and the hub of said swivel ring between said first and second annular gaps.

12. The seal for an axle bearing of claim 11 wherein a hole extends in said sealing ring between said groove and a radially inner portion of said chamber.

13. The seal for an axle bearing of claim 3 wherein said sealing ring extends axially outward of said hub of said swivel ring adjacent the axially outer end of said first annular gap.

* * * * *